No. 718,439. PATENTED JAN. 13, 1903.
A. DUCASBLE.
CELLULAR RUBBER TIRE FOR VEHICLES.
APPLICATION FILED NOV. 13, 1902.
NO MODEL.
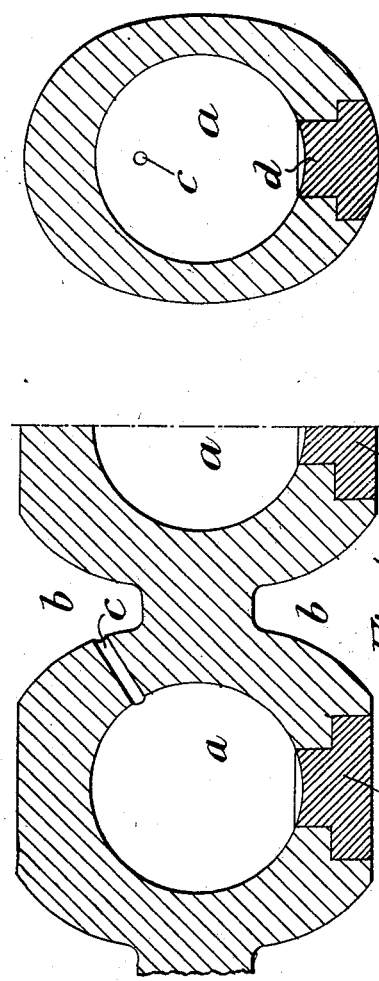
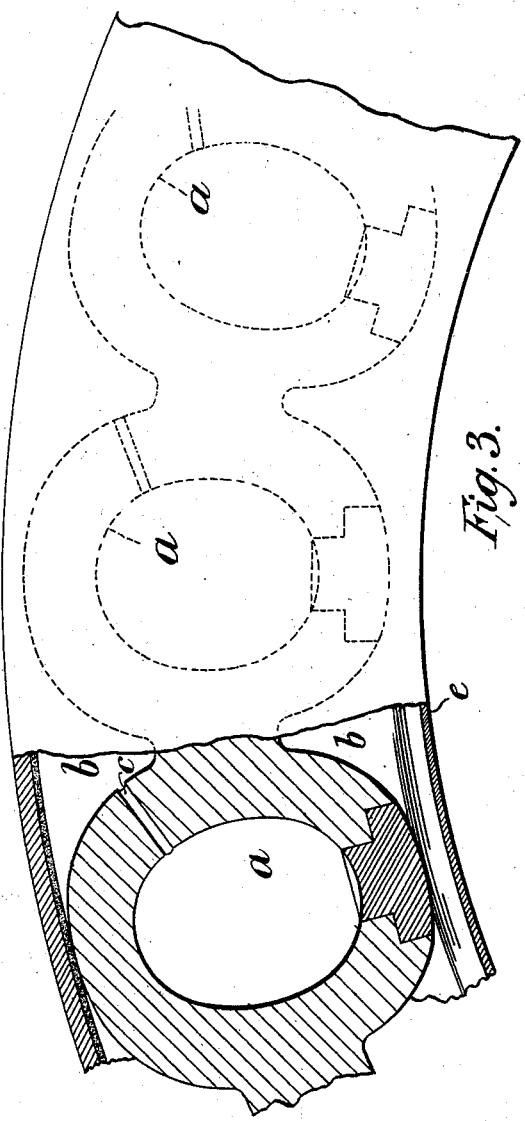
Attest:
C. Middleton
Edw. L. Reed
Inventor:
Alfred Ducasble.
by Ellis Spear & Company
Attys

UNITED STATES PATENT OFFICE.

ALFRED DUCASBLE, OF ASNIÈRES, FRANCE.

CELLULAR RUBBER TIRE FOR VEHICLES.

SPECIFICATION forming part of Letters Patent No. 718,439, dated January 13, 1903.

Application filed November 13, 1902. Serial No. 131,254. (No model.)

*To all whom it may concern:*

Be it known that I, ALFRED DUCASBLE, engineer, a citizen of the French Republic, residing at Asnières, Seine, France, have invented certain new and useful Improvements in Cellular Rubber Tires for Vehicles, (for which I have made application for Letters Patent in Great Britain, No. 23,026, dated November 14, 1901,) of which the following is a specification.

My invention relates to resilient tires for vehicle-wheels, and has for its object to produce a tire in which strength and durability are combined.

My invention consists in a new form of elastic tire in which a series of hollow chambers of nearly-spherical form are employed within a strong cover of any well-known construction and fastened to the rim in any suitable manner. The hollow chambers have annular spaces between them at their points of junction and are provided with holes connecting these spaces with the interiors of the hollow chambers, so that the air in any chamber is displaced into the annular space with which it is connected when that particular part of the tire is depressed at the tread and is sucked in again when the pressure is removed. The action of the chambers under road stresses is thus similar to that of the ball of a spray-diffuser, and the tire is kept comparatively cool.

A tire constructed according to my invention has all the advantages of a pneumatic tire filled with compressed air—that is, speed, suppleness, efficiency, absence of heating—without having the drawbacks of artificial inflation and liability to deflation by puncturing.

The accompanying sheet of drawings illustrates clearly one method of carrying my invention into effect, Figure 1 being a longitudinal section of part of a tire constructed according to my invention. Fig. 2 is a cross-sectional view of the same. Fig. 3 shows a shape assumed by the tire when placed inside its cover.

In carrying my invention into effect according to the example illustrated in the drawings I form a ring or band of rubber or other suitable material of cylindrical or oval cross-section and having a number of hollow chambers $a$ formed in it at equal intervals. Between these chambers the band is reduced in cross-section, leaving a V-shaped groove $b$ around the band, which forms an annular space when the tire is in place inside its cover. Small holes $c$ form communication between each of these annular spaces $b$ and the hollow chambers $a$, so that when a chamber $a$ is compressed some of the air from it is expelled into the annular space $b$; but a supply is sucked back again when the pressure is released. This constant interchange of air tends to keep the tire cool, the annular spaces being in free communication with the air through orifices $e$ in the rim. The plugs $d$ are used to close the holes left in the chambers in the course of manufacture.

The walls of the chambers may be of uniform thickness and have a perfectly circular cross-section, or they may be somewhat thickened at the tread and where they rest on the rim of the wheel and have an oval section, as shown in Fig. 2, or they may be thickened at the tread only. I find it preferable to thicken the tire at least on the outside, as this gives a narrower tread or bearing surface on the road. I also find it preferable to compress these hollow chambers circumferentially, so that they assume a shape as shown in Fig. 3. This makes the strength of the tire to oppose compression very uniform and has the effect of making it run very smoothly.

Having now described my invention, what I claim as new, and desire to secure by Letters Patent, is—

1. In a resilient tire for vehicle-wheels, the combination with a flexible outer cover of an inner continuous elastic band containing a series of hollow chambers, the band being reduced in diameter between said chambers so as to leave annular spaces open to the atmosphere between the band and the outer cover, and small apertures forming communication between the hollow chambers and said annular spaces substantially as described.

2. In a resilient tire for vehicle-wheels, the combination with a flexible outer cover of an inner continuous elastic band containing a series of hollow chambers having their walls thickened at the part which comes nearest the road, the band being reduced in diameter between said hollow chambers so as to leave annular spaces open to the atmosphere between the band and the outer cover and small apertures forming communication between the hollow chambers and said annular spaces substantially as described.

3. In a resilient tire for vehicle-wheels, the combination with a flexible outer cover of an inner elastic band containing a series of hollow chambers having their walls thickened at the parts which come nearest the road and rim of the wheel, the band being reduced in diameter between said hollow chambers so as to leave annular spaces open to the atmosphere between the band and the outer cover and small apertures forming communication between the hollow chambers and said annular spaces substantially as described.

4. In a resilient tire for vehicle-wheels the combination with a flexible outer cover of an inner elastic band compressed circumferentially inside the outer cover and containing a series of hollow chambers the band being reduced in diameter between said hollow chambers so as to leave annular spaces open to the atmosphere between the band and the outer cover and small apertures forming communication between the hollow chambers and said annular spaces substantially as described.

In witness whereof I have hereunto set my hand in presence of two witnesses.

ALFRED DUCASBLE.

Witnesses:
EDWARD P. MacLEAN,
GEORGE E. LIGHT.